(12) United States Patent
Arbouzov

(10) Patent No.: US 11,865,747 B2
(45) Date of Patent: Jan. 9, 2024

(54) LIGHT PLASTIC DENSIFIER

(71) Applicant: Ivan Arbouzov, Southlake, TX (US)

(72) Inventor: Ivan Arbouzov, Southlake, TX (US)

( * ) Notice: Subject to any disclaimer, the term of this patent is extended or adjusted under 35 U.S.C. 154(b) by 52 days.

(21) Appl. No.: 17/119,469

(22) Filed: Dec. 11, 2020

(65) Prior Publication Data

US 2022/0184862 A1   Jun. 16, 2022

(51) Int. Cl.
*B29C 43/36* (2006.01)
*B29C 43/02* (2006.01)
*B29C 43/52* (2006.01)
*B29C 43/58* (2006.01)

(52) U.S. Cl.
CPC .............. *B29C 43/36* (2013.01); *B29C 43/02* (2013.01); *B29C 43/52* (2013.01); *B29C 43/58* (2013.01); *B29C 2043/366* (2013.01); *B29C 2043/5816* (2013.01)

(58) Field of Classification Search
CPC .. B02C 4/40; B02C 23/08; B02C 4/08; B29B 17/0026; B29C 43/58; B29C 2043/366; B29C 43/5816; B29C 43/02; B29C 43/52; B29C 43/36; B30B 9/3082; B30B 9/3035; B65F 1/0033
USPC .................................................... 264/331.11
See application file for complete search history.

(56) References Cited

U.S. PATENT DOCUMENTS

| | | | |
|---|---|---|---|
| 5,489,200 A * | 2/1996 | McGraw ............. | B29B 17/0026 425/149 |
| 2001/0052346 A1 | 12/2001 | Vuilleumer et al. | |
| 2010/0048743 A1 | 2/2010 | Rapson | |
| 2013/0020734 A1* | 1/2013 | Conforty ............. | B29B 17/0052 425/403.1 |
| 2015/0325353 A1* | 11/2015 | Matsui .................. | B64C 13/341 361/170 |
| 2017/0114205 A1 | 4/2017 | Maille | |
| 2020/0268037 A1* | 8/2020 | Holmes ..................... | B02C 4/08 |

FOREIGN PATENT DOCUMENTS

WO    WO-9728910 A1 *  8/1997  ........... B09B 3/0025

OTHER PUBLICATIONS

Tong (English Translation of CN113601743) (Year: 2021).*
International Search Report and Written Opinion in International Appln. No. PCT/US2021/062355, dated Feb. 23, 2022, 10 pages.

* cited by examiner

*Primary Examiner* — Matthew J Daniels
*Assistant Examiner* — Hana C Page
(74) *Attorney, Agent, or Firm* — Fish & Richardson P.C.

(57) ABSTRACT

In general, this disclosure relates to an apparatus that compresses lightweight plastic waste (e.g., used grocery bags, empty trash bags, food wrappers, etc.), and then applies a limited amount of heat to "bake" the compressed plastic into a "brick" of plastic. The plastic is compressed, and then heated enough to cause it to retain its compressed shape, without melting or substantial outgassing.

8 Claims, 6 Drawing Sheets

LIGHT PLASTIC DENSIFIER

TECHNICAL FIELD

The present disclosure relates to densification of plastic material, preparing the material to be further recycled. This disclosure generally relates to transforming non-recyclable, lightweight, plastic waste into a recyclable form.

BACKGROUND

Plastic waste can present a long-lasting, difficult to store and transport pollutant. Plastic has many good structural qualities. It is lightweight and strong, as well as inexpensive to manufacture. As a result, lightweight plastics have become a part of everyday life for much of the world.

SUMMARY

The present disclosure involves systems, methods, and an apparatus for densifying plastic, such as plastic waste in the household. One example implementation includes a plastic densifier including a body that partially encloses an interior volume with an aluminum interior surface. A loading port in the body can allow plastic to be loaded into the body, and a lift within the body can reduce the interior volume when actuated, compressing plastic within the interior volume. A heating element positioned beneath and abutting the aluminum surface can be configured to heat the plastic within the body to a temperature in the range of 100 C to 180 C.

Implementations can optionally include one or more of the following features.

In some instances, the plastic densifier includes a loading mechanism affixed to the loading port, the loading mechanism including: a roller with a frictional surface that is configured to grab plastic and draw the plastic into the body, a comb fitted onto the roller and configured to remove plastic from the roller and deposit it through the loading port, and a roller motor configured to rotate the roller. The plastic densifier can also include a controller which controls operations of the plastic densifier and a lift motor which actuates the lift.

In some instances, the plastic densifier includes one or more temperature sensors and one or more current sensors which measure electrical current supplied to the lift motor. In some instances, the controller adjusts power supplied to the heating element to maintain a temperature sensed by the temperature sensor within a range of 100 C to 180 C. The controller can also be configured to apply current to the lift motor to a predetermined threshold. The predetermined threshold can be a current associated with a desired amount of compression of the plastic.

In some instances, a viewing window in the body is provided to permit inspection of the interior volume and of the plastic in the body.

In some instances, a cover is hingedly connected to the body.

In general the present disclosure contemplates a method for densifying plastic, the method including loading plastic to be densified into a compression chamber, compressing the plastic, and applying heat to the plastic to achieve a temperature in a range of 100 C to 180 C, to bake the compressed plastic into a brick.

In some instances, during loading operations, the plastic is periodically compressed without applying heat.

In some instances, heat is applied to the plastic in response to a signal that the compression chamber is full.

In some instances, a loading mechanism that is automatically activated in response to a signal indicating the presence of plastic in the loading mechanism is used to load plastic into the compression chamber.

In some instances, the compression of the plastic, and applying heat to the plastic is repeated at least once. In some instances, applying compression and heat to the plastic is repeated in response to an indication that a predetermined compression ratio has not been achieved.

In some instances, compressing and applying heat to the plastic is repeated a predetermined number of times.

The details of these and other aspects and embodiments of the present disclosure are set forth in the accompanying drawings and the description below. Other features, objects, and advantages of the disclosure will be apparent from the description, drawings, and the claims.

DETAILED DESCRIPTION

In general, the disclosure relates to an apparatus, and method of use, for densifying plastic waste. Densified plastic waste is more compact, and solid than in its non-densified form. Lightweight plastic waste (e.g., used grocery bags, empty trash bags, food wrappers, etc.) can be difficult to store and transport, as well as process for recycling. This disclosure describes a convenient solution to allow users to compress or densify plastic waste in their home, making it readily recyclable, more conveniently stored, or easily transported for further processing.

The apparatus compresses the plastic waste, and then applies a limited amount of heat to "bake" the compressed plastic into a "brick" of plastic. Most plastic materials will begin to outgas volatile organic compounds (VOCs) when above a certain temperature. VOCs are generally toxic and undesirable in a residential setting, therefore the disclosed apparatus does not raise the temperature of the plastic so high as to cause widespread melting and therefore significant outgassing of the plastic. Instead the plastic is compressed, and then heated enough to cause it to retain its compressed shape, without melting or substantial outgassing.

Figure 1:
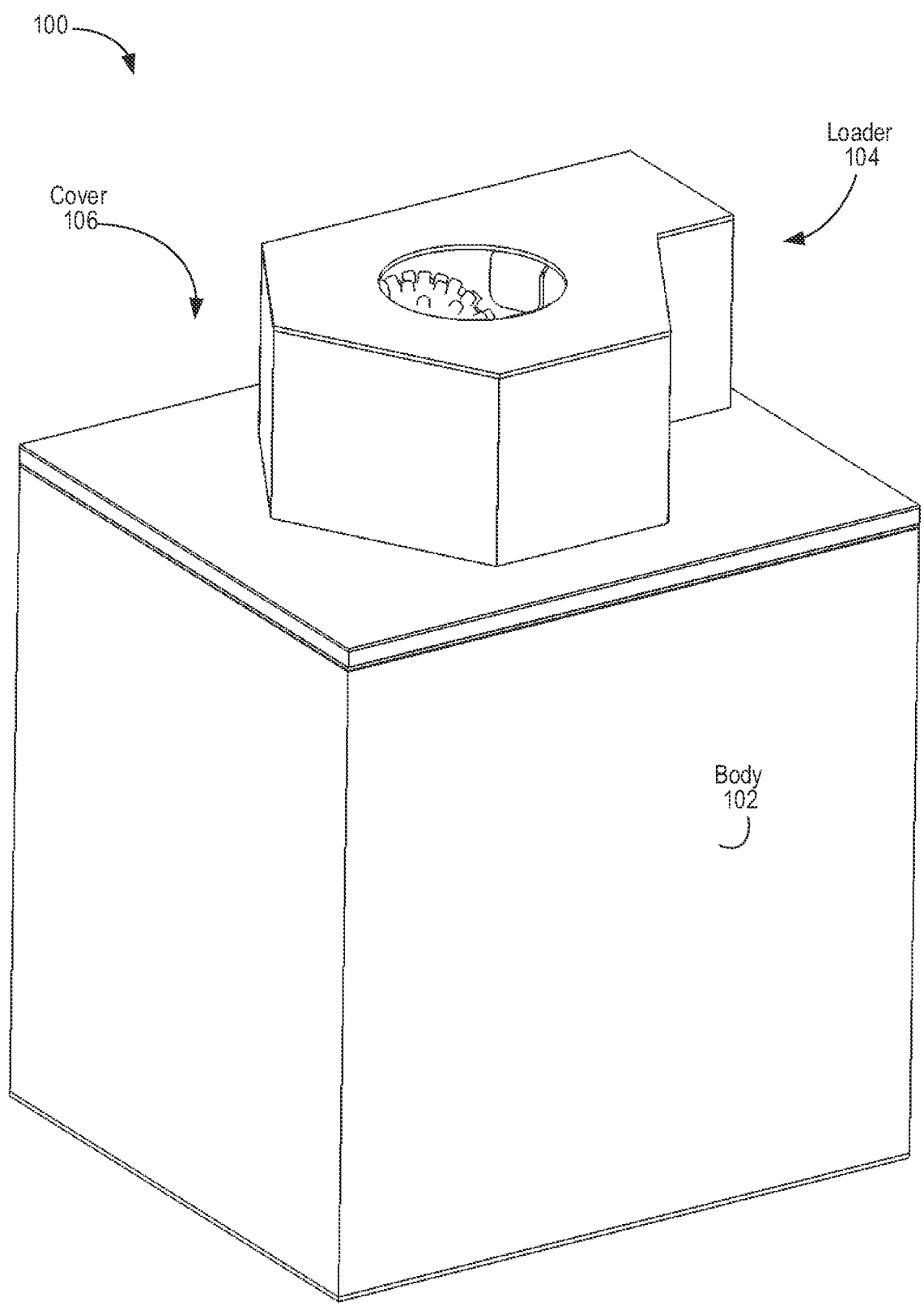
FIG. 1 is an external isometric view of an example plastic densifier.

FIG. 1 is an external isometric view of a plastic densifier 100. The plastic densifier 100 can include a body 102, which houses the majority of the components and can provide an aesthetically pleasing structure for the plastic densifier 100. In some implementations, the body 102 is constructed of plastic, aluminum, steel, or any other suitable material. A cover 106 can be hingedly connected to the body, and can be opened to allow for removal of densified plastic or maintenance of the plastic densifier 100. In some implementations, the cover 108 is slotted into the body 102 (e.g., via a tongue and groove system), or simply placed on top of the body 102, the present disclosure is not limited thereto. The cover 106 will be described in further detail below with reference to FIG. 4.

In some implementations, the plastic densifier 100 includes a loader 104 or loading mechanism. The loader 104 can be mounted to the cover 106 or the body 102, and can assist in feeding light plastic waste into the body 102. In some implementations, the loader 104 includes active powered components which are described in greater detail below and with reference to FIGS. 2 and 3.

Figure 2:
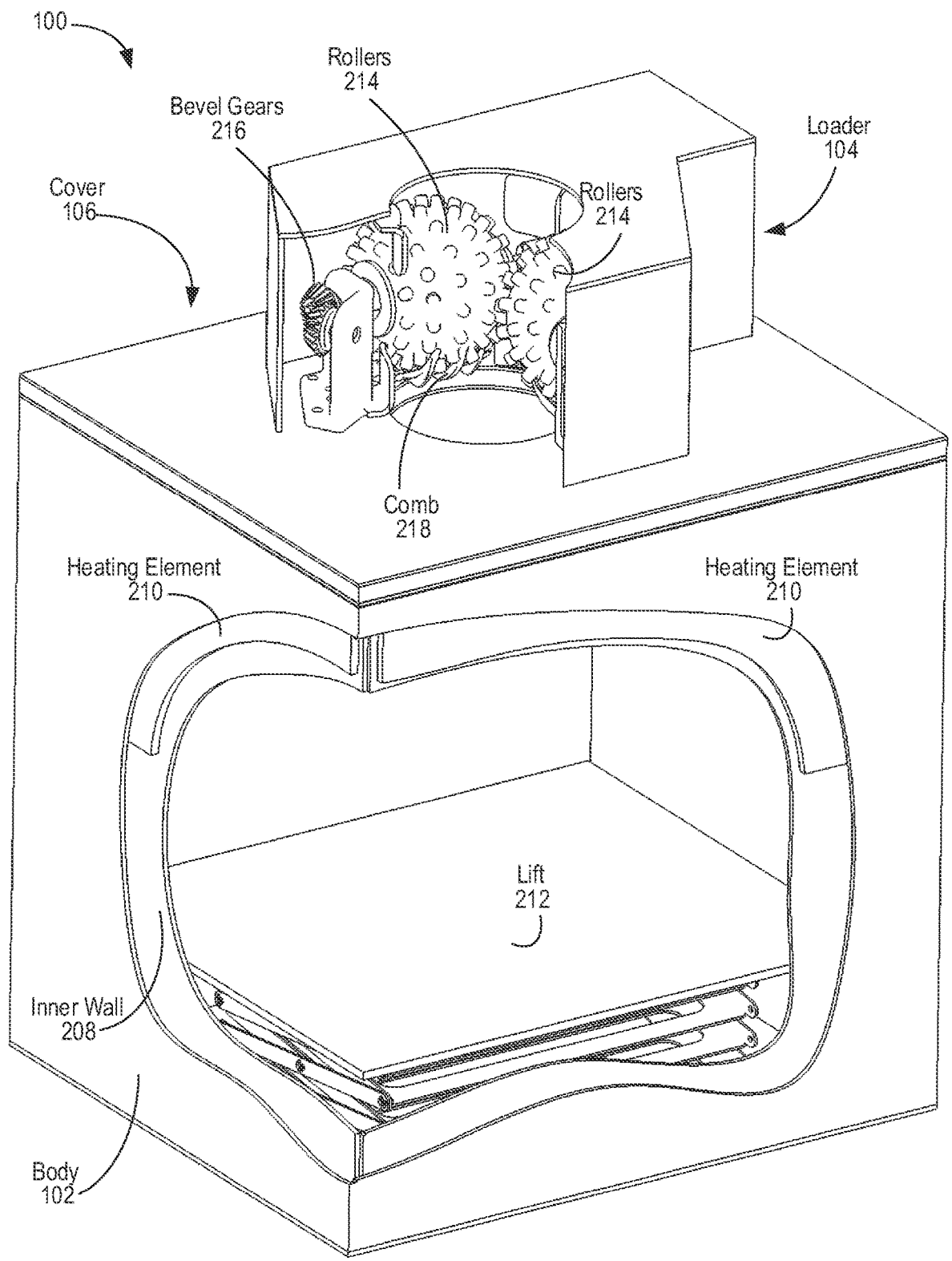
FIG. 2 is a cutaway diagram showing an interior portion of a plastic densifier.

FIG. 2 is a cutaway diagram showing an interior portion of plastic densifier 100 and some of the additional components. The body 102 includes an inner wall 208 which can be constructed of an aluminum material. Aluminum is advantageous because it is a good heat conductor and heated plastic will not stick to it. In some implementations, the inner wall 208 is steel or another suitable material which has good heat conductivity, sufficient structural integrity, and will not stick to the heated plastic.

Heating elements 210 can be positioned between the inner wall 208 and the outside wall of the body 102 to enclose a portion of the interior volume of the body 102. The heating elements 210 can include resistive heating components, such as Nichrome 80/20 (80% nickel and 20% chromium) strips, silicon carbide, or other element that can convert electrical power to heat. Heating elements 210 are positioned to apply heat to compressed plastic within the body 102 of the plastic densifier 100. In some implementations, there are heating elements 210 in each wall (e.g., 4 walls) of the body 102, as well as in the cover 106 and the lift 212, to provide heat to the plastic from every direction.

Lift 212 is a mechanism configured to reduce the volume of storage space inside the body 102, compressing plastic within. Lift 212 is shown in a scissor lift configuration, with a flat plate supported by a number of crosslinks. In some implementations, lift 212 can have an aluminum top surface with a heating element 210 configured to apply heat to the bottom of the plastic being compressed. Lift 212 can be actuated by any suitable means. In some implementations, a hydraulic or electric motor can rotate a screw drive which alters the distance between two links of the scissor lift at the bottom end. An example lift motor is illustrated and discussed in further detail below with respect to FIG. 3.

Loader 104 in FIG. 2 is illustrated with a portion of its external housing removed, showing the rollers 214, bevel gears 216, and comb 218. It should be noted that a roller 214 has been removed from the diagram for clarity. Rollers 214 can include a number of bumps or knobs which can grab light plastic to feed it into the body 102. The rollers 214 can be rubber, plastic, metal, or a combination thereof which is suitable for providing traction to pull plastic into the plastic densifier 100. As illustrated, the rollers 214 can have a generally spherical shape. In some implementations, they can be cylindrical or helical, among other shapes. Rollers 214 can be driven by a motor (not shown) which can rotate all the rollers 214 via bevel gears 216. In the illustrated example there are three spherical rollers 214, however more, or fewer, rollers 214 (e.g., six, or two) can be implemented without departing from the scope of this disclosure.

Figure 3:
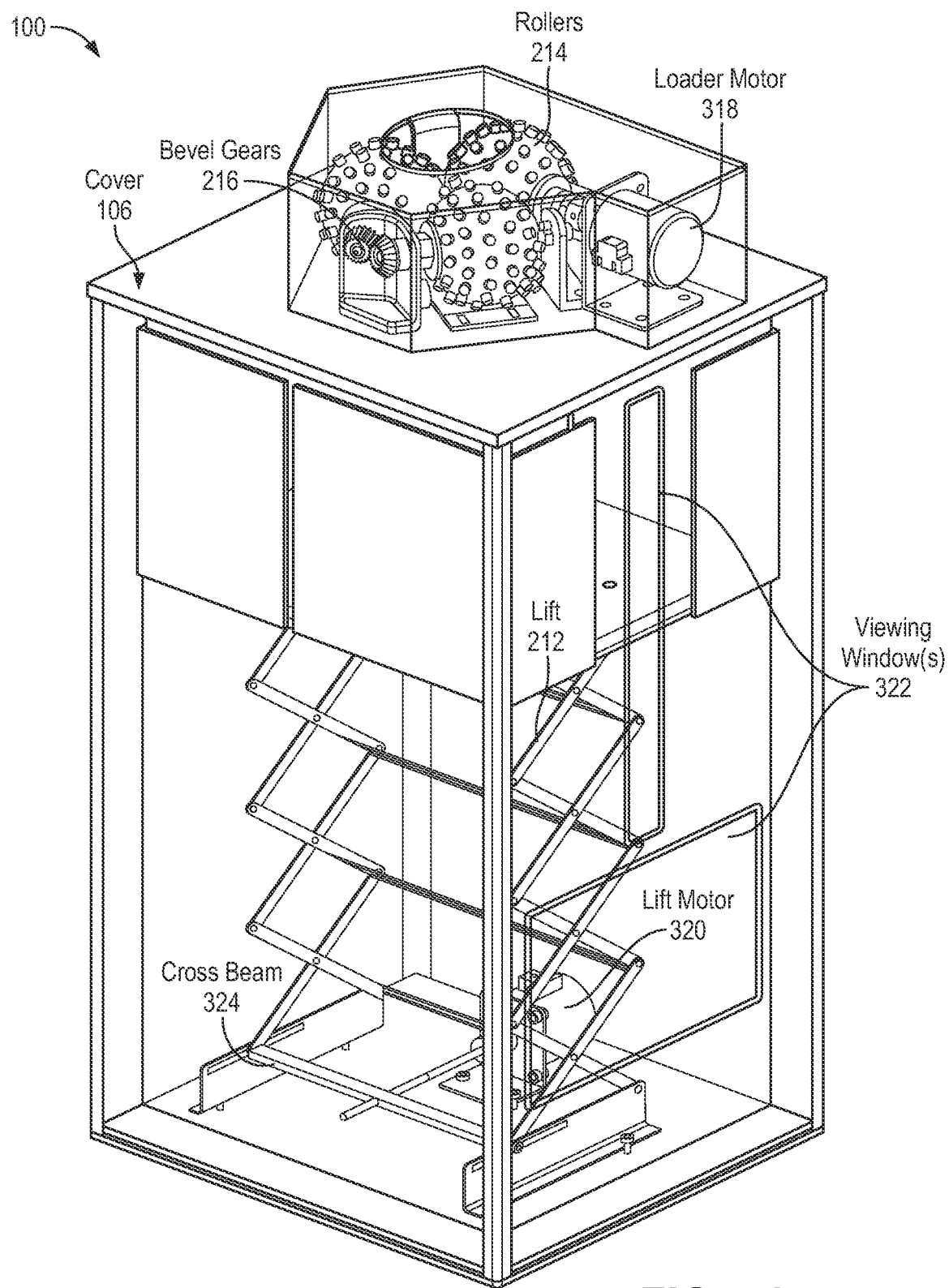
FIG. 3 depicts an example plastic densifier in a rotated view, with some housing components transparent for clarity.

FIG. 3 depicts an example plastic densifier 100 in a rotated view, with some housing components transparent for clarity. The lift 212 is shown in an extended position, as it might be if it were compressing plastic. In the illustrated implementation, the lift 212 is actuated by a lift motor 320, which can be an electric motor (e.g., brushless DC motor, stepper motor, AC motor, etc.) that drives a screw drive, which translates cross beam 324, causing the scissor mechanism of the lift 212 to extend or retract based on the direction of rotation for the lift motor 320.

Loader motor 318 is also illustrated in FIG. 3, and can be a single electric motor, similar to, or different from lift motor 320. Loader motor 318 in the illustrated implementation drives three rollers 214 via multiple sets of bevel gears 216.

Viewing windows 322 can optionally be installed in the body 102 and can provide for a means for a user to visually verify the plastic within the plastic densifier 100. The viewing windows 322 can be a Plexiglas material, glass, quartz, or other suitable transparent material (e.g., Pyrex®). As shown in the illustrated example, two viewing windows 322 can be installed, a long vertical window which shows the amount of plastic in the body 102 as well as the position of the lift 212. In addition the vertical window, a lower, larger window can be provided to permit inspection of the densified plastic. In some implementations, the lower window 322 can be open-ended for easy removal of the densified plastic.

Figure 4:
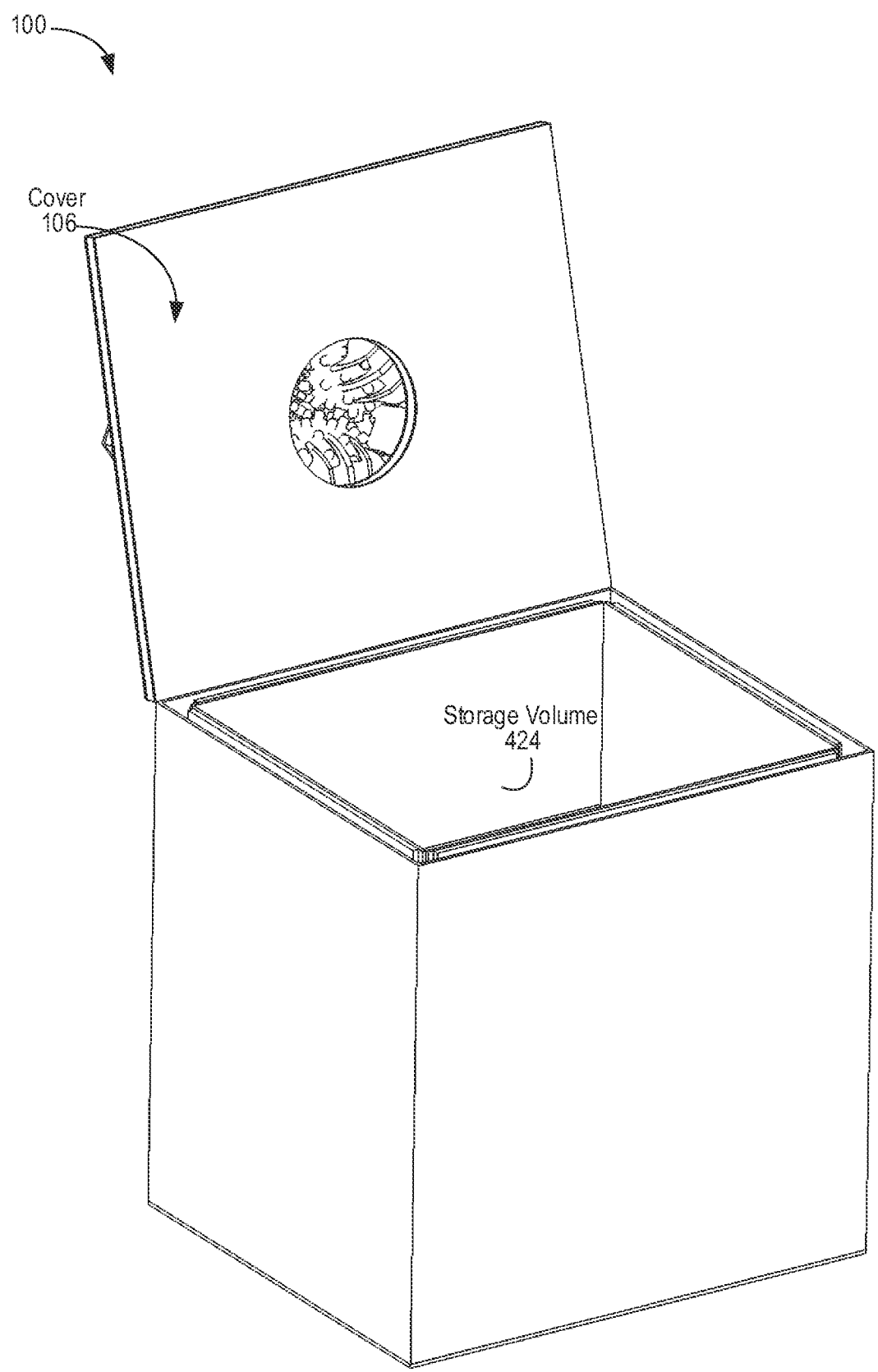
FIG. 4 illustrates the plastic densifier with its cover in an open position.

FIG. 4 illustrates the plastic densifier with its cover 106 in an open position. The open cover 106 can provide access to the storage volume 424, which is within the body 102 of the plastic densifier 100. Storage volume 424 can be the region where plastic is stored, compressed, and heated for densification. In some implementations, the open cover 106 permits easy removal of densified plastic from the storage volume 424.

Figure 5B:
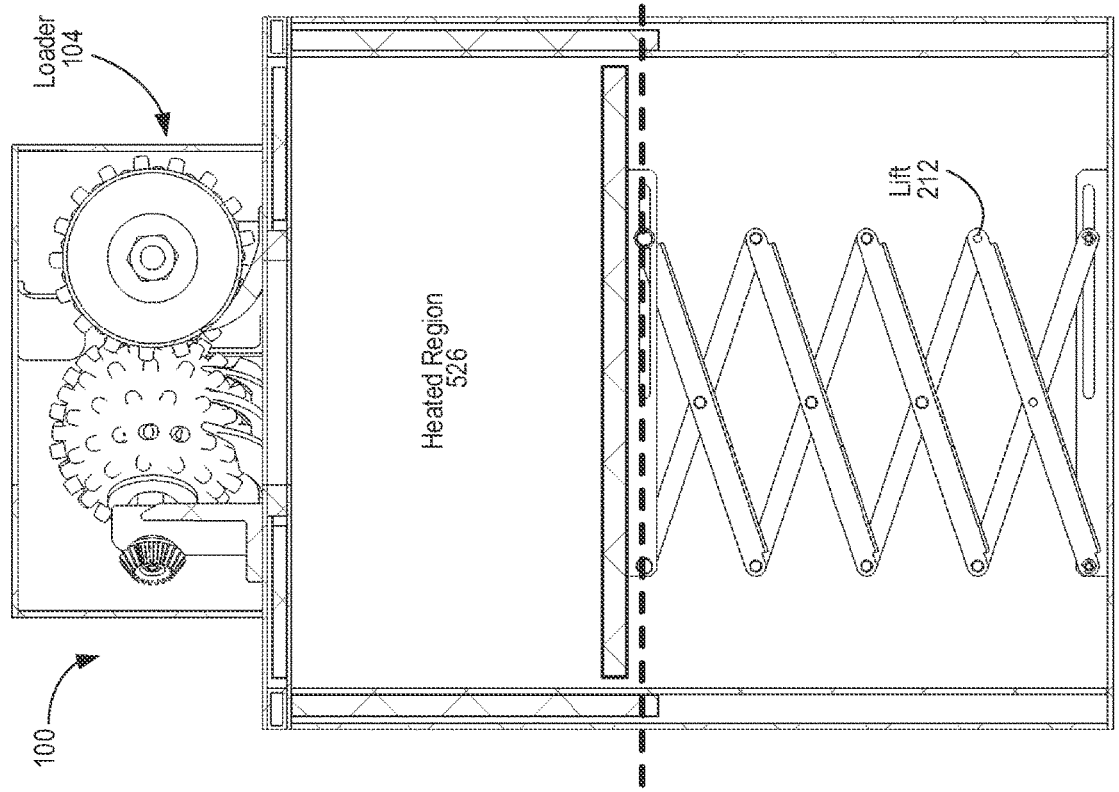
FIGS. 5A and 5B show a side cutaway diagram of the plastic densifier 100.
Figure 5A:
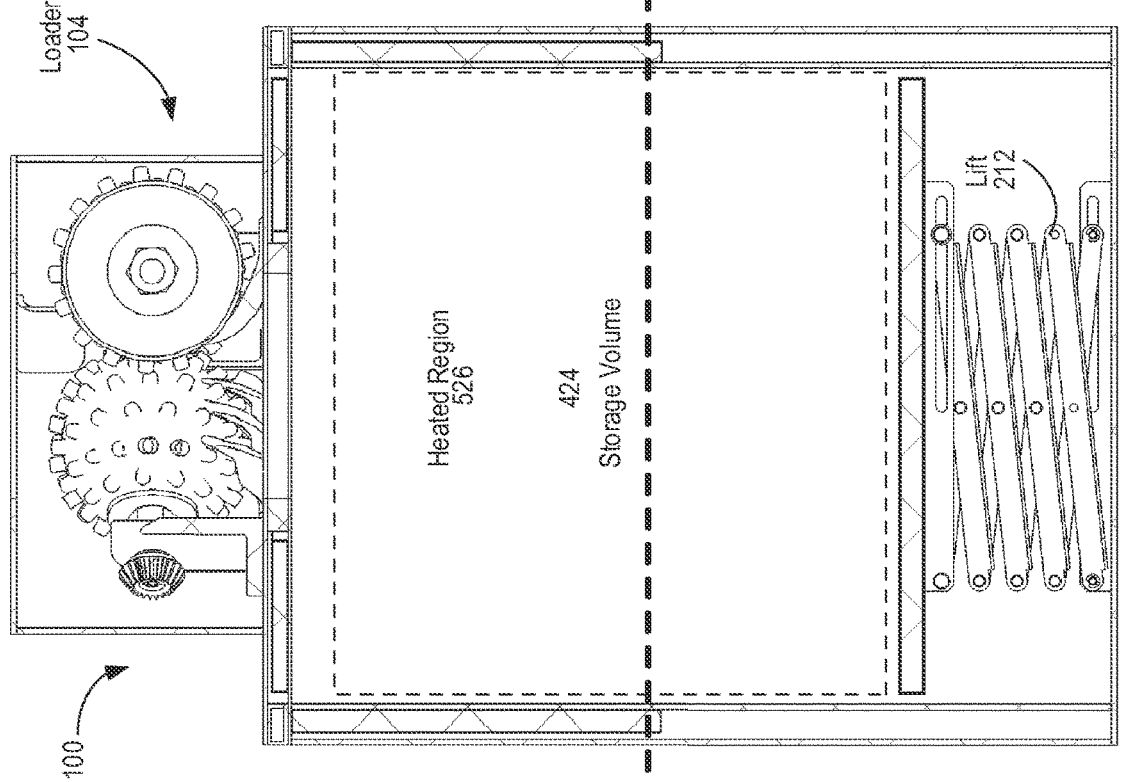

FIGS. 5A and 5B show a side cutaway diagram of the plastic densifier 100. Regions of FIGS. 5A and 5B with a cross hash pattern indicate regions of the plastic densifier 100 with heating elements to apply heat to the plastic. In general, operations of the plastic densifier 100 can be broken into two phases: a loading phase and a densification phase.

During the loading phase, the lift 212 can be maintained near the bottom of the plastic densifier 100 as shown in FIG. 5A. Plastic to be densified is loaded in via the loader 104. In some implementations, the loader includes one or more sensors and automatically activates when the presence of plastic to be loaded is detected. In general, the loading phase can be a long-term phase. For example, the plastic densifier 100 can be in the loading phase whenever it is not full, and can be slowly filled with plastic to be densified (e.g., grocery bags, wrappers, packing material, etc.) over a period of time (e.g., one week, on month, etc.). Upon the plastic densifier 100 being filled, it can then begin a densification phase. In some implementations, the plastic densifier 100 automatically detects when it is full and begins densification. In some implementations, densification is initiated based on user input (e.g., the user presses a "compress" or "densify" button).

During the densification phase, the lift 212 can rise, compressing the light plastic into a smaller volume that comprises the heated region 526. In some implementations, a predetermined amount of pressure is applied by the lift 212. For example, by measuring the current supplied to an electric motor actuating the lift 212, it can be determined how much torque, and therefore, how much pressure is being exerted. In some implementations, additional sensors (e.g., a force sensor or pressure sensor) can be used to determine what height to raise the lift 212 to. Once the plastic is compressed, heating elements can apply heat to "bake" the plastic, causing it to harden and retain its compressed shape, without significant melting or outgassing of the plastic. The applied heat maintains the plastic in the range of 100 C to 180 C, and preferably below 120 C. The upper bound of 180 C prevents significant outgassing of the plastic, and the release of toxic VOCs. The lower bound of 100 C ensures any moisture present in the plastic is vaporized and able to escape the densified plastic. In some implementations, once the plastic is within the desired temperature range, the lift is further actuated, applying additional pressure to further compress the plastic. This can be a cyclic, iterative process of applying heat and pressure. In some implementations, the process is carried out a predetermined number of times (e.g., 3 times, or 5 times etc.). In some implementations, the process can be carried out until a predetermined criteria is met (e.g., compression ratio or target volume). For example, the process can repeat until a compression ratio of less than 5% is achieved. Following densification, the heating elements can be de-energized and the densified plastic allowed to return to ambient temperature. The lift 212 can either retract, to allow more plastic to be loaded on top of the brick of densified plastic or maintain position, to allow for easy removal of the brick. In some implementations, upon opening of the cover, or a removal port in the plastic densifier 100, the lift 212 can raise the brick up and partially out of the densifier 100, to make it readily removable.

Figure 6:
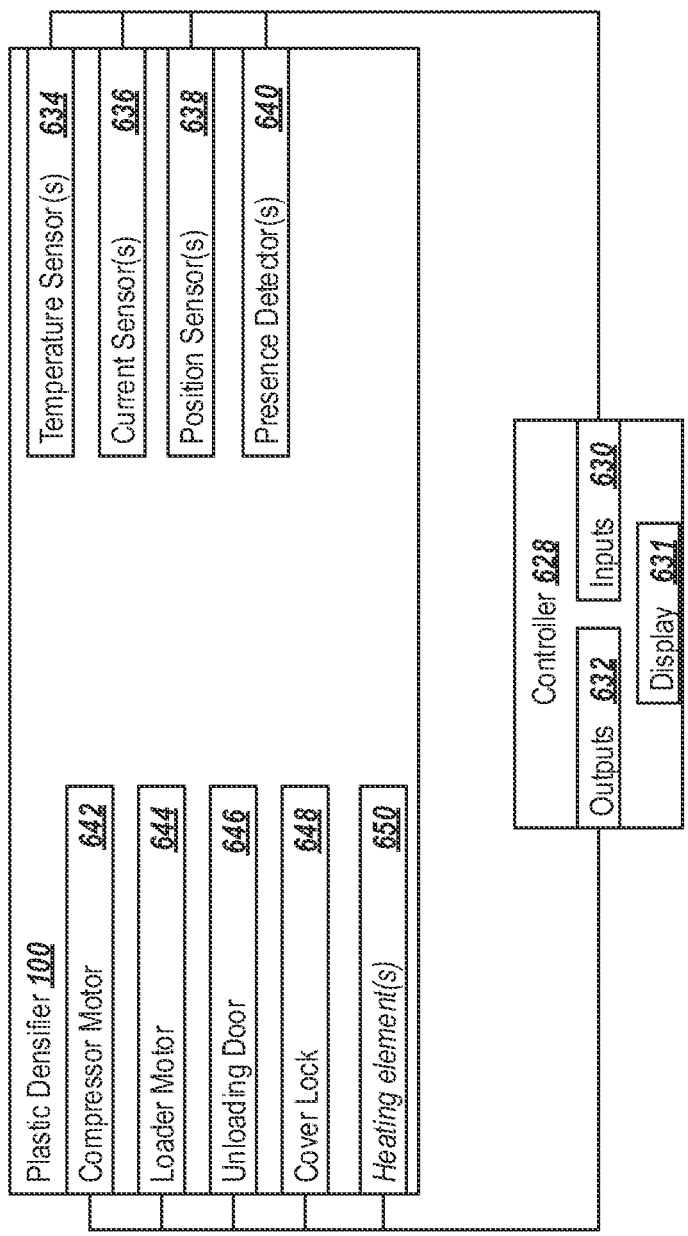
FIG. 6 is a block diagram illustrating a controller 628 and some sensors and systems the controller can actuate.

FIG. 6 is a block diagram illustrating a controller 628 and some sensors and systems the controller can actuate. The plastic densifier 100 can be communicatively coupled with a controller 628. While illustrated in FIG. 6 as separate components, the controller 628, or a portion of the controller 628, can be integrated into the plastic densifier 100.

The controller 628 can receive inputs 630 from various sensors within the plastic densifier 100. These inputs can include a temperature signal from one or more temperature sensors 634. The temperature sensors 634 can be thermocouples, resistance temperature detectors (RTDs), thermistors, or other suitable temperature sensors. Temperature sensors 634 can be located within the plastic densifier, or near heating elements 650, which can be similar to, or different from heating elements 210 as described with reference to FIG. 2. Temperature sensors 634 can provide signals indicating the temperature of the heating elements 650, the internal temperature of the plastic densifier 100, a measured or estimated temperature of plastic within the plastic densifier 100 or any combination thereof. Controller 628 can further receive inputs 630 from one or more current sensors 636, which can provide an indication of electrical current supplied to various components in the plastic densifier 100 (e.g., compressor motor 642, loader motor 644, heating elements 650, etc.). One or more position sensors 638 can also provide inputs 630 to the controller. The position sensors 638 can be, for example, encoders connected to actuators associated with the loader or the lift (e.g., lift 212 and loader 104 as described with respect to FIG. 2). In some implementations, position sensors 638 can be Hall Effect sensors, or an array of Hall Effect sensors, which sense magnetic fields and are able to determine the location of various components of the plastic densifier 100 (e.g., lift 212, cover 106, etc.).

One or more presence detector 640 can sense the presence of plastic in the plastic densifier 100. Presence detector 640 can be, for example infrared (IR) rangefinders or ultrasonic sensors, which detect the presence of a solid object in a specific region. Presence detector 640 can determine whether a piece of plastic has entered the loader (e.g., loader 104) and allow the controller 628 to actuate the loader motor 644 accordingly. Presence detectors 640 can additionally detect or sense an estimated volume of plastic in the plastic densifier (e.g., in the storage volume 424)

The controller 628 can include a display 631 or provide signals to a display 631, which can generally provide the user information on the current status and operations of the plastic densifier 100. The display 631 can be an LCD display, OLED display, or any other suitable display. Display 631 can provide a graphical user interface to relay information to a user, as well as receive one or more inputs (e.g., via a touchscreen and soft keys, or buttons associated with the display) from the user.

The controller 628 can provide one or more outputs 632 to the system, including but not limited to, driving currents or control signals to the compressor motor 642, which can be similar to, or different from the lift motor 320 as described with respect to FIG. 3, the loader motor 644, which can be similar to or different from the loader motor 318 as described with respect to FIG. 3, the unloading door 646, which can, in some implementations, be the cover 106 as described in FIG. 1, a cover lock 648, and one or more heating elements 650. Outputs 632 can be electrical signals, digital or analog, or mechanical signals and outputs (e.g., rotation of a motor or gear).

In some implementations, where the unloading door 646 is automated, the controller 628 can automatically open the unloading door 646 upon completion of a densification phase, for easy removal of the densified plastic. In some implementations, when the heating elements 650 are active or when the compressor motor 642 is active, the cover lock 648 can be engaged, preventing inadvertent opening of the plastic densifier 100 by the user, when the plastic is hot and/or under pressure.

The preceding figures and accompanying description illustrate example processes and systems. However, the described system (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or perform additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A plastic densifier comprising:
   a controller, configured to control operations of the plastic densifier;
   a body, at least partially enclosing an interior volume with an aluminum interior surface;
   a cover, hingedly connected to the body and configured to pivot open to provide access to the interior volume;
   a loading port in the cover, configured to allow plastic to be loaded into the interior volume;
   a loading mechanism affixed to the loading port and comprising:
   a roller, comprising a frictional surface, and configured to grab plastic and draw it into the body;

a comb fitted onto the roller, the comb configured to remove the plastic from the roller and deposit it through the loading port; and a roller motor, configured to rotate the roller;

a lift within the body and configured to reduce the interior volume when actuated, compressing plastic within the interior volume;

a lift motor, configured to actuate the lift;

a current sensor configured to measure electrical current supplied to the lift motor;

a heating element positioned beneath and abutting the aluminum surface, the heating element configured to heat the plastic within the body to a temperature in a range of 100° C. to 145° C.; and a temperature sensor for determining a temperature within the body.

2. The plastic densifier of claim 1, wherein the controller is configured to adjust power supplied to the heating element to maintain a temperature sensed by the temperature sensor within the range of 100° C. to 145° C.

3. The plastic densifier of claim 1, wherein the controller is configured to apply current to the lift motor up to a predetermined threshold, wherein the predetermined threshold is a current associated with a desired amount of compression of the plastic.

4. The plastic densifier of claim 1, comprising a viewing window in the body to permit visual inspection of plastic in the body.

5. A system for densifying plastic, the system comprising:

a controller, configured to control operations of the system;

a body at least partially enclosing an interior volume with an aluminum interior surface;

a cover, hingedly connected to the body and configured to pivot open to provide access to the interior volume;

a loading port in the cover, configured to allow plastic to be loaded into the interior volume;

a loading mechanism affixed to the loading port and comprising:

a roller, comprising a frictional surface, and configured to grab plastic and draw it into the body;

a comb fitted onto the roller, the comb configured to remove the plastic from the roller and deposit it through the loading port; and a roller motor, configured to rotate the roller;

a lift within the body and configured to reduce the interior volume when actuated, compressing plastic within the interior volume;

a lift motor, configured to actuate the lift;

a current sensor configured to measure electrical current supplied to the lift motor;

a heating element positioned beneath and abutting the aluminum surface, the heating element configured to heat the plastic within the body to a temperature in the range of 100° C. to 145° C.; and a temperature sensor for determining a temperature within the body.

6. The system of claim 5, wherein the controller is configured to adjust power supplied to the heating element to maintain a temperature sensed by the temperature sensor within the range of 100° C. to 145° C.

7. The system of claim 5, wherein the controller is configured to apply current to the lift motor up to a predetermined threshold, wherein the predetermined threshold is a current associated with a desired amount of compression of the plastic.

8. The system of claim 5, comprising a viewing window in the body to permit visual inspection of plastic in the body.

* * * * *